(12) United States Patent
Ley et al.

(10) Patent No.: US 8,420,151 B2
(45) Date of Patent: Apr. 16, 2013

(54) MIXTURES HAVING A SALTY TASTE

(75) Inventors: Jakob Ley, Holzminden (DE); Guenter Kindel, Hoexter (DE); Sylvia Muche, Holzminden (DE); Kathrin Freiherr, Dassel-Hilwartshausen (DE); Stefan Brennecke, Halle (DE); Gerhard Krammer, Holzminden (DE)

(73) Assignee: Symrise AG, Holzminden (DE)

( * ) Notice: Subject to any disclaimer, the term of this patent is extended or adjusted under 35 U.S.C. 154(b) by 993 days.

(21) Appl. No.: 12/090,673

(22) PCT Filed: Oct. 6, 2006

(86) PCT No.: PCT/EP2006/067120
§ 371 (c)(1),
(2), (4) Date: Jan. 27, 2009

(87) PCT Pub. No.: WO2007/045566
PCT Pub. Date: Apr. 26, 2007

(65) Prior Publication Data
US 2009/0214728 A1 Aug. 27, 2009

Related U.S. Application Data

(60) Provisional application No. 60/728,744, filed on Oct. 21, 2005.

(51) Int. Cl.
*A23L 1/237* (2006.01)
(52) U.S. Cl.
USPC .............................. 426/648; 426/74; 426/649
(58) Field of Classification Search .................. 426/648, 426/649, 74
See application file for complete search history.

(56) References Cited

U.S. PATENT DOCUMENTS

| | | | |
|---|---|---|---|
| 2,824,008 A | 2/1958 | Perri et al. | |
| 3,159,585 A | 12/1964 | Evans et al. | |
| 3,782,974 A | 1/1974 | Lontz et al. | |
| 3,971,852 A | 7/1976 | Brenner et al. | |
| 4,066,799 A | 1/1978 | Cornelius et al. | |
| 4,216,244 A | 8/1980 | Allen, Jr. et al. | |
| 4,243,691 A * | 1/1981 | Mohlenkamp et al. | 426/649 |
| 4,297,375 A | 10/1981 | Shackelford | |
| 4,340,614 A | 7/1982 | Pich et al. | |
| 4,532,145 A | 7/1985 | Saleeb et al. | |
| 4,963,387 A * | 10/1990 | Nakagawa et al. | 426/649 |
| 4,997,672 A | 3/1991 | DeSimone et al. | |
| 5,124,162 A | 6/1992 | Boskovic et al. | |
| 5,145,707 A | 9/1992 | Lee | |
| 5,213,838 A * | 5/1993 | Sheikh | 426/649 |
| 5,562,942 A * | 10/1996 | Koh et al. | 426/649 |
| 5,637,618 A | 6/1997 | Kurtz et al. | |
| 5,711,985 A * | 1/1998 | Guerrero et al. | 426/649 |
| 5,853,792 A * | 12/1998 | Zolotov et al. | 426/649 |
| 6,541,050 B1 | 4/2003 | Bonorden et al. | |
| 6,743,461 B1 * | 6/2004 | Vasquez | 426/649 |
| 2002/0188019 A1 | 12/2002 | Ley et al. | |
| 2005/0075368 A1 | 4/2005 | Dewis et al. | |
| 2005/0123670 A1* | 6/2005 | Vasquez | 426/649 |

FOREIGN PATENT DOCUMENTS

| | | |
|---|---|---|
| EP | 0 125 021 | 11/1984 |
| FR | 2 196 151 | 3/1974 |
| GB | 1 469 089 | 3/1977 |
| JP | 63-137657 | 6/1988 |
| NL | 225 189 A | 10/1959 |
| WO | WO8505252 * | 12/1985 |
| WO | WO-8505252 A1 | 12/1985 |

OTHER PUBLICATIONS

"Yeast Extract" Retrieved from the Internet: URL: http://en.wikipedia.org/wiki/Yeast_extract [retrieved on Jun. 30, 2010].
European Office Action issued in counterpart Application No. 06 807 022.6, including English language translation, received on Jul. 19, 2010.
Murray, N. "Reduction on the Increase," *Food Processing*, pp. 21-22, (May 2004).
Keast, et al. "Suppression of Bitterness Using Sodium Salts," *Chimia*, vol. 55, No. 5, pp. 441-447, (2001).
Ruusunen, et al. "Reducing sodium intake from meat products," *Meat Science*, vol. 70, pp. 531-541, (2005).
Okiyama, et al. "Taste Dimensions of Monosodium Glutamate (MSG) in a Food System: Role of Glutamate in Young American Subjects," *Physiology & Behavior*, vol. 65, No. 1, pp. 177-181, (1998).
Ball, et al. "Calcium diglutamate improves taste characteristics of lower-salt soup," *European Journal of Clinical Nutrition*, vol. 56, pp. 519-523, (2002).

* cited by examiner

*Primary Examiner* — Carolyn Paden
(74) *Attorney, Agent, or Firm* — Novak Druce Connolly Bove + Quigg LLP

(57) ABSTRACT

The present invention relates to a mixture comprising or consisting of:
(a) one or more inorganic salts which are suitable for nutrition and are not sodium chloride,
(b) one or more mono- or polyvalent salts of polybasic food acids,
(c) one or more amino acids, or salts thereof, which are suitable for nutrition.

14 Claims, No Drawings

MIXTURES HAVING A SALTY TASTE

CROSS REFERENCE TO RELATED APPLICATION

This application claims the benefit of PCT/EP2006/067120 filed on Oct. 6, 2006, and U.S. Provisional Patent Application No. 60/728,744, filed on Oct. 21, 2005, the disclosures of which are hereby incorporated by reference herein in their entireties.

FIELD OF THE DISCLOSURE

The present invention primarily relates to (i) certain mixtures (substance mixtures) having a salty taste which are based on
(a) one or more inorganic salts which are suitable for nutrition (physiologically acceptable) and are not sodium chloride and are preferably sodium-free,
(b) one or more mono- or polyvalent (preferably sodium-free) salts of polybasic food acids and
(c) one or more amino acids, or salts thereof, which are suitable for nutrition.

The invention furthermore relates to (ii) powders which can be prepared from the mixtures according to the invention, (iii) compositions which are suitable for consumption and comprise a mixture according to the invention or a powder according to the invention, (iv) ready-to-use or -eat formulations and semi-finished products which serve for nutrition or consumption for pleasure and (v) the use of mixtures and powders according to the invention for generating an enhancement of a common salt taste. Further aspects of the present invention emerge from the following description and the patent claims.

The mixtures and powders according to the invention are employed in particular for the preparation of foodstuffs and compositions for consumption for pleasure of reduced common salt content with the aim of imitating the salty taste and/or enhancing the existing salty taste.

Too high a consumption of common salt (common salt and edible salt are identical to sodium chloride), especially in the western diet, contributes towards an increased incidence of high blood pressure in the population. Diseases, in particular cardiovascular diseases, can be triggered or promoted by increased blood pressure (cf. also N. Murray, *Food Processing* 2004 (May), pages 21-22).

On the other hand, the salt taste caused in particular by common salt is very important for the choice of foodstuffs and compositions for consumption for pleasure based on taste. In sensorial tests, the more salty variant is often preferred. Common salt furthermore serves to mask bitter taste impressions (R. S. J. Keast, P. A. S. Breslin and G. K. Beauchamp, *Chimia* 2001, 55 (volume 5), pages 441-447) and/or as a general taste enhancer, and is therefore employed in a large number of primarily non-salty foodstuffs and compositions for consumption for pleasure.

In some traditional foodstuffs and compositions for consumption for pleasure, such as uncooked sausage or bread, the common salt content can be lowered significantly without a severe loss in taste (e.g. Marita Ruusunen and Eero Puolanne, *Meat Science* 2005, 70 (volume 3), pages 531-541). In other less traditional uses, such as ready-made soups or other ready-made food or nibbles, on the other hand, reduction in the common salt content is difficult, since the common salt content has usually already been optimized for the taste.

It is a worthy aim to limit the daily intake of common salt, and in particular sodium ions. In this context, however, the deficits in taste caused by the reduction in the common salt content should be largely avoided, in order to retain the preference for the foodstuff or composition for consumption for pleasure. Some systems have already been described as agents for reducing the common salt content (called "salt substitute" in the following). One of the oldest methods is replacement of sodium chloride by potassium chloride. In a recent publication (U.S. Pat. No. 6,541,050), mixtures of various salts (potassium chloride and other sulfates and chlorides) are furthermore described as a solution to the problem. Nevertheless, it is known that potassium chloride in the same concentration as sodium chloride has a decidedly unpleasant taste, which is described as bitter by some people, alongside the salty taste. Possibilities for suppressing the bitterness were therefore already sought early on, as described e.g. in U.S. Pat. No. 5,637,618 for the use of 2,4-dihydroxybenzoic acid.

A further more frequently used method for reducing the common salt content is the use of glutamic acid salts, in particular monosodium glutamate, as described e.g. in U.S. Pat. No. 4,066,799 or in A. Okiyama and G. K. Beauchamp, *Physiol. Behav.* 1998, 65 (volume 1), pages 177-181. However, calcium glutamate can also be used, an actual reduction in the common salt content being achieved: P. Ball, D. Woodward, T. Beard, A. Shoobridge and M. Ferrier, *Eur. J. Clin. Nutr.* 2002, 56 (volume 6), pages 519-523. Nevertheless, relatively high concentrations of glutamate have the disadvantage that it can trigger the so-called "Chinese restaurant syndrome" in sensitive people.

A combination of potassium chloride and yeast preparations is described in U.S. Pat. No. 4,297,375. Nevertheless, the proteins or peptides from yeast preparations can lead to allergies, and a widespread use is not aimed for because of the characteristic aromas of the yeast preparations.

Combination of potassium chloride with sweeteners, such as thaumatin, has also been described (JP 63-137657). Nevertheless, the scope of uses is limited by the simultaneous use of sweeteners.

A combination of potassium chloride and a fruit acid has been described e.g. in U.S. Pat. No. 3,782,974.

A mixture based only on food acids is to be found in U.S. Pat. No. 3,782,974.

An aqueous seasoning solution for the preparation of salty-tasting foodstuffs comprising 60-85 wt. % of water, 5-15% of a potassium salt, 8-18% of an organic acid, 1-3% of a magnesium salt and 2-15% of a calcium salt is described in US 2005/0123670. However, the pure salt taste of sodium chloride cannot be achieved with such seasoning solutions, since the free acid component causes too intense a sour taste in the combination described.

A pure combination of certain amino acids with common salt for reducing the sodium ion content with a similar taste has also already been described (e.g. U.S. Pat. No. 5,145,707). Nevertheless, here also an intense secondary taste is often to be detected.

In US 2005/0075368, fatty acid alkamides which are said to cause a salt taste-enhancing impression are described. However, these unsaturated fatty acid alkamides are accessible only with relative difficulty and are not stable in every type of application. Furthermore, they are not of natural origin.

Combinations of substances having a trigeminal action, such as cetylpyridinium chloride, with amino acids, such as arginine, are described in U.S. Pat. No. 4,997,672. In this context, however, it is a disadvantage that trigeminal irritants employed can accumulate and lead to undesirable irritations of the oral cavity.

The primary object of the present invention was to provide a substance or substance mixture which is not based on sodium chloride (common salt) and nevertheless causes and/or enhances a common salt taste. By providing the substance or mixture it should become possible to lower considerably the sodium ion content in formulations which conventionally contain common salt, without a loss in the preference by the consumer.

According to a first aspect of the present invention, the object described is achieved by a mixture comprising or consisting of:
(a) one or more inorganic salts which are suitable for nutrition and are not sodium chloride,
(b) one or more mono- or polyvalent salts of polybasic food acids,
(c) one or more amino acids, or salts thereof, which are suitable for nutrition.

The mixture according to the invention is suitable for generating and for enhancing a common salt taste.

A mixture according to the invention can also comprise as component (d) sodium chloride (common salt), the salty taste of which is then enhanced by the combination of components (a), (b) and (c).

A preferred mixture according to the invention comprises or consists of:
(a) 1 to 50 wt. %, preferably 10 to 40 wt. % of one or more inorganic salts which are suitable for nutrition and are not sodium chloride,
(b) 10 to 90 wt. %, preferably 30 to 80 wt. %, particularly preferably 55 to 80 wt. % of one or more mono- or polyvalent salts of polybasic food acids,
(c) 0.1 to 30 wt. %, preferably 2 to 25 wt. % of one or more amino acids, or salts thereof, which are suitable for nutrition,
(d) 0 to 20 wt. %, preferably 0 to 15 wt. % of sodium chloride, in each case based on the dry mass of the mixture.

In the context of the present text, dry mass is understood as meaning the mathematically determined mass of the anhydrous, i.e. completely dewatered, mixture. Water of crystallization and hydration is thus also not a constituent of the dry mass.

Component (a):

Preferred inorganic acids which are suitable for nutrition for use in component (a) of a mixture according to the invention are preferably sodium-free. The use of inorganic salts from the group consisting of potassium, calcium, magnesium and ammonium salt with mono- or polyvalent inorganic counter-anions, and mixtures thereof, is particularly preferred. These inorganic salts can be anhydrous or can contain water of crystallization.

The mono- or polyvalent inorganic counter-anions are preferably chosen from the group consisting of phosphate, hydrogen phosphate, dihydrogen phosphate, pyrophosphate, hydrogen pyrophosphate, polyphosphate, chloride, carbonate, bicarbonate, sulfate, hydrogen sulfate, nitrite, nitrate and mixtures thereof. The use of phosphate, hydrogen phosphate, dihydrogen phosphate, chloride, carbonate, bicarbonate and mixtures thereof is particularly preferred.

The use of a component (a) in which the inorganic salts which are suitable for nutrition and are not sodium chloride are chosen from the group consisting of anhydrous calcium chloride, calcium chloride dihydrate, calcium chloride hexahydrate, anhydrous magnesium chloride, magnesium chloride dihydrate, magnesium chloride hexahydrate, potassium dihydrogen phosphate and dipotassium hydrogen phosphate is very particularly preferred.

The inorganic salts for use in component (a) of a mixture according to the invention which are described above as preferred are particularly preferably combined with components (b) and (c) which are described below as preferred.

Preferably, in component (b) of a mixture according to the invention, the mono- or polyvalent salts of polybasic food acids are chosen from the group consisting of potassium, calcium, magnesium or ammonium salts of mono- or polyvalent anions of food acids.

Component (b):

In the foodstuffs sector, food acids are understood as meaning organic acids which, e.g. on the basis of their sour taste, their buffer action (lowering) or complexing, may be used in the preparation and formulation of foodstuffs or are contain naturally in foodstuffs.

In monovalent salts of a polybasic food acid, any desired carboxyl group of the food acid is deprotonated, and in the case of monovalent cations a molar ratio of food acid anion/cation of 1:1 and in the case of divalent cations a molar ratio of food acid anion/cation of 2:1 exists. In polyvalent salts of polybasic food acids, more than one of the carboxyl functions of the food acids is deprotonated; in the case of monovalent cations, a corresponding number of cations is then associated with the deprotonated carboxyl groups, and in the case of divalent cations the corresponding half the number of cations.

Mono- or polyvalent salts of polybasic food acids which are chosen from the group consisting of citric acid, succinic acid, fumaric acid, maleic acid, malic acid and isomers thereof, tartaric acid and isomers thereof, malonic acid, glutaric acid, mucic acid, hydroxycitric acid and all the possible stereoisomers of the abovementioned food acids are particularly preferred for use in component (b).

The mono- or polyvalent salts of succinic acid and D-, L- and D,L-malic acid are particularly preferred.

Preferably, the salts of the polybasic food acids are sodium-free.

It is very particularly preferable to choose the mono- or polyvalent salts of the polybasic food acids from the group consisting of potassium succinate, dipotassium succinate, potassium malate, dipotassium malate and mixtures thereof.

The mono- or polyvalent salts, which are described above as preferred, of polybasic food acids are combined, in particular, with the inorganic salts of component (a) which are described above as preferred and with the amino acids or amino acid salts of component (c) which are described below as preferred.

Component (c):

Proteinogenic L-amino acids (and salts thereof) and amino acids which are formed by primary or secondary metabolic pathways (and salts thereof) are suitable in particular for use in component (c) of a mixture according to the invention. Only amino acids (and salts thereof) which are toxicologically acceptable are of course to be employed; only then are the amino acids and salts thereof suitable for nutrition.

Amino acids (and salts thereof) which are chosen from the group consisting of glycine, L-alanine, L-valine, L-leucine, L-isoleucine, L-phenylalanine, L-tyrosine, L-glutamine, L-glutamic acid, L-asparagine, L-aspartic acid, L-serine, L-threonine, L-cysteine, L-methionine, L-proline, L-lysine, L-arginine, L-tryptophan, L-histidine, L-pyrolysine, L-pyroglutamine, L4-trans-hydroxyproline, L-3-cis-hydroxyproline, L-homoserine, L-homocysteine, L-cystine, L-ornithine and L-citrulline are preferably employed in component (c) of a mixture according to the invention. The use of L-glutamine, L-glutamic acid, L-asparagine, L-aspartic acid, L-valine, L-arginine and L-lysine . . . . Each of the amino acids mentioned can also be employed in the form of their salt, in particular in the form of their particular hydrochloride.

The amino acids and salts thereof which are described above as preferred are suitable in particular for combination with the inorganic salts of component (a) and mono- or polyvalent salts of polybasic food acids of components (b) which are described above as preferred.

A particularly preferred mixture according to the invention comprises:
(a) 1 to 50 wt. % of one or more potassium, calcium, magnesium and/or ammonium salts which have mono- or polyvalent inorganic counter-anions and are suitable for nutrition,
(b) 10 to 90 wt. % of one or more potassium, calcium, magnesium and/or ammonium salts of mono- or polyvalent anions of food acids,
(c) 0.1 to 30 wt. % of one or more proteinogenic L-amino acids or amino acids formed by primary or secondary metabolic pathways, or salts thereof, which are suitable for nutrition,
(d) 0 to 20 wt. % of sodium chloride, in each case based on the dry mass of the mixture.

Preferably, the said mixture comprises the components (a), (b), (c) and (d) mentioned.

Very particularly preferably, a mixture according to the invention comprises
(a) 10 to 40 wt. % of one or more potassium, calcium, magnesium and/or ammonium salts which have mono- or polyvalent inorganic counter-anions and are suitable for nutrition,
(b) 30 to 80 wt. %, particularly preferably 55 to 80 wt. % of one or more potassium, calcium, magnesium and/or ammonium salts of mono- or polyvalent anions of food acids,
(c) 2 to 25 wt. % of one or more proteinogenic L-amino acids or amino acids formed by primary or secondary metabolic pathways, or salts thereof, which are suitable for nutrition,
(d) 0 to 15 wt. % of sodium chloride, in each case based on the dry mass of the mixture.

It is particularly advantageous if the said mixture comprises the components (a), (b), (c) and (d) mentioned.

As already emerges from the abovementioned preferences in respect of components (a), (b) and (c), certain substance combinations are preferred. In particular, if the abovementioned concentration ranges of components (a), (b), (c) and (d) are adhered to, it is advantageous if component (a) comprises anhydrous calcium chloride, calcium chloride dihydrate, calcium chloride hexahydrate, anhydrous magnesium chloride, magnesium chloride dihydrate, magnesium chloride hexahydrate, potassium dihydrogen phosphate and/or dipotassium hydrogen phosphate, component (b) comprises potassium succinate, dipotassium succinate, potassium malate and/or dipotassium malate and component (c) comprises L-glutamine, L-glutamic acid, L-asparagine, L-aspartic acid, L-valine, L-arginine and/or L-lysine and/or salts thereof.

The content of components (a), (b) and (c) in a mixture according to the invention is preferably in the range of from 50 to 100 wt. %, preferably in the range of from 65 to 100 wt. %, particularly preferably in the range of from 80 to 100 wt. %, in each case based on the dry mass of the mixture.

Very particularly preferred mixtures according to the invention are, in particular, those such as are defined above in more detail in respect of the contents of components (a), (b), (c) and (d), wherein component (a) comprises at least three different inorganic salts which are suitable for nutrition and which are not sodium chloride and component (c) comprises at least three different amino acids, or salts thereof, which are suitable for nutrition. The at least three inorganic salts are preferably sodium-free and, in particular, salts of calcium, magnesium and potassium. The above statements apply accordingly in respect of preferred salts. The at least three amino acids, or salts thereof, which are suitable for nutrition are preferably chosen from the group consisting of L-glutamine, L-glutamic acid, L-asparagine, L-aspartic acid, L-valine, L-arginine, L-lysine and salts thereof; the hydrochlorides are preferred as corresponding salts.

Component (a) having at least three inorganic salts and component (c) having at least three amino acids which are suitable for nutrition are preferably combined with a component (b) in which the mono- or polyvalent salts of polybasic food acids are chosen from the groups which consists of the (preferably sodium-free) salts of succinic acid and/or D-, L- and/or D,L-malic acid. These are preferably the potassium salts of the said food acids (in this context see also above). Where appropriate, sodium chloride can of course also be present as component (d) alongside components (a), (b) and (c), but components (a), (b) and (c) themselves are preferably sodium-free. The above statements apply in respect of preferred embodiments of these particularly preferred mixtures according to the invention, in particular in respect of preferred concentration ranges.

It has been found in our own studies that in foodstuffs of greatly reduced common salt content, i.e. foodstuffs which contain up to 50% less common salt than is otherwise customary, thus, for example, in seasoned foodstuffs, such as tomato soup, chicken soup, baked nibbles, ready-made pizza, potato crisps and popcorn, the mixtures according to the invention can imitate and/or enhance the common salt taste particularly well both in the initial taste (impact) and in the longer-lasting perception of taste, and the taste experience is therefore found to be pleasant, and in many cases even preferred. In addition, it was found in our own studies that the common salt content in non-seasoned foodstuffs, for example sweet biscuits, which serves to enhance the taste can be lowered significantly (by about 30 to 70 wt. %) by using mixtures according to the invention, without impairing the particular aroma profile.

The individual components considered in themselves in each case are not able or are able to only a limited extent to imitate and/or to enhance the taste of common salt. In this respect, see the above discussion of the prior art.

For the results according to the invention, it is essential that mono- or polyvalent salts of polybasic food acids and not the corresponding free food acids themselves are employed in component (b) of a mixture according to the invention. In the case of alternative use of the free food acids (in combination with components (a) and (c) as envisaged according to the invention), the desired effects do not arise to an adequate extent.

The mixtures according to the invention can be prepared by simple mixing of the components. In this case, the mono- or polyvalent salts of polybasic food acids according to component (b) are prepared beforehand, for example by addition of a corresponding base, preferably an oxide, hydroxide, carbonate or bicarbonate, preferably of potassium, calcium or magnesium, to the corresponding free polybasic food acid. The neutralization can be carried out in the dry, but advantageously in the dissolved state, as a result of which the mono- or polyvalent salts of polybasic food acids are obtained. The neutralization is preferably carried out in aqueous solution. For the preparation of a mixture according to the invention, alternatively, components (a) and/or (c) can also first be mixed with the free food acid(s); however, a corresponding base must then be added to the premix such that the free polybasic food acids are converted into the corresponding mono- or polyvalent salts. In this context see also the examples below.

The present invention also provides a powder which can be prepared by (a) dissolving a mixture according to the invention (in particular in one of the preferred embodiments) in water and (b) drying the solution (in particular by the route of spray drying or freeze drying).

If a mixture according to the invention or a corresponding powder comprises L-lysine or a salt thereof (in particular lysine hydrochloride) as constituent (c), the content of component (c) is preferably in the range of from 10 to 30 wt. %; however, if component (c) does not comprise lysine or a lysine salt, the content of component (c) is preferably only in the range of from 1 to 10 wt. %, based on the dry mass of the mixture according to the invention.

The present invention also relates to compositions, in particular compositions which are suitable for consumption, which comprise a mixture according to the invention or a powder according to the invention and one or more further constituents which are suitable for consumption. The above statements apply accordingly in respect of preferred embodiments of the mixture according to the invention contained in the composition or the powder according to the invention.

A number of compositions according to the invention are preferred. A (preferably spray-dried) composition which comprises, alongside (i) the mixture according to the invention or the powder according to the invention, (ii) one or more solid carrier substances which are suitable for consumption is preferred in particular. Preferred compositions comprise the mixture according to the invention or the powder according to the invention and the carrier substance(s).

Advantageous carrier substances in these preferred (preferably spray-dried) compositions according to the invention which are to be mentioned are silicon dioxide (silica, silica gel), carbohydrates and/or carbohydrate polymers (polysaccharides), cyclodextrins, starches, degraded starches (starch hydrolysates), chemically or physically modified starches, modified celluloses, gum arabic, gum ghatti, tragacanth, karaya, carrageenan, guar bean flour, carob bean flour, alginates, pectin, inulin or xanthan gum. Preferred starch hydrolysates are maltodextrins and dextrins.

Preferred carrier substances are silicon dioxide, gum arabic and maltodextrins, maltodextrins having DE values in the range of 5 to 20 in turn being preferred here. It is irrelevant here what plants originally supplied the starch for the preparation of the starch hydrolysates. Maize-based starches and starches from tapioca, rice, wheat or potatoes are suitable and readily available. In this context, the carrier substances can also function as flow auxiliaries, such as, for example, silicon dioxide.

The compositions according to the invention which also comprise one or more solid carrier substances alongside a mixture according to the invention or a powder according to the invention can be prepared, for example, by mechanical mixing operations, during which a comminution of the particles of the particles present can simultaneously also take place, or by means of spray drying. Compositions according to the invention which comprise solid carrier substances and are prepared by means of spray drying are preferred; in respect of the spray drying, reference is made to U.S. Pat. No. 3,159,585, U.S. Pat. No. 3,971,852, U.S. Pat. No. 4,532,145 or U.S. Pat. No. 5,124,162.

Preferred compositions according to the invention which comprise carrier substances and have been prepared by means of spray drying have a particle size in the range of 30-300 μm and a residual moisture content of less than or equal to 5 wt. %.

The weight ratio of mixture according to the invention or powder according to the invention to the solid carrier substance(s) suitable for nutrition is preferably in the range of from 100:1 to 1:100, preferably in the range of from 10:1 to 1:20, particularly preferably in the range of from 1:1 to 1:5, based on the dry mass of the composition.

The total of the constituents of (i) mixture according to the invention or powder according to the invention and (ii) the carrier substance(s) in the composition is preferably in the range of from 70 to 100 wt. %, preferably in the range of from 85 to 100 wt. %.

The invention also relates to a (preferably spray-dried) composition which additionally comprises, alongside (i) a mixture according to the invention or a powder according to the invention and (ii) solid carrier substances, (iii) one or more aroma compositions or consists of the components mentioned.

An aroma composition in the context of the present invention comprises at least one volatile aroma substance. The volatile aroma substance here is preferably a sensorially active component having a vapour pressure of greater than or equal to 0.01 Pa at 25° C., preferably a vapour pressure of greater than or equal to 0.025 Pa at 25° C. The majority of volatile aroma substances have a vapour pressure of greater than or equal to 1 Pa at 25° C., and these aroma substances are regarded as preferred for the use in compositions according to the invention.

Examples of aroma substances which can be a constituent of the aroma composition are to be found e.g. in K. Bauer, D. Garbe and H. Surburg, Common Fragrance and Flavor Materials, 4th Ed., Wiley-VCH, Weinheim 2001.

Examples which may be mentioned are: esters (saturated or unsaturated), such as e.g. ethyl butyrate, allyl caproate, benzyl acetate and methyl salicylate; organic acids (saturated and unsaturated), such as e.g. butyric acid, acetic acid, methylbutyric acid and caproic acid; alcohols (saturated and unsaturated), such as e.g. ethanol, propylene glycol, octenol, cis-3-hexenol and benzyl alcohol; aldehydes (saturated and unsaturated), such as e.g. acetaldehyde, isobutyraldehyde, nonadienal, benzaldehyde, vanillin and 3-phenylacetaldehyde; ketones, such as e.g. menthone; O-heterocyclic compounds, such as e.g. 4-hydroxy-5-methylfuranone, 3-hydroxy-4,5-dimethyl-2-(5H)-furanone, 2,5-dimethyl-3-hydroxy-2(3H)-furanone, 2(5)-ethyl-4-hydroxy-5(2)-methyl-3(2H)-furanone and maltol; ethers, such as e.g. p-methoxybenzaldehyde, guaiacol, eugenol and methoxyvinylphenol; lactones, such as e.g. gamma-decalactone; terpenes, such as e.g. limonene, linalool, terpinene, terpineol, citral (geranial and neral) and menthol; sulfides and disulfides, such as e.g. dimethyl sulfide, difurfuryl disulfide and methylthiopropanal; thiols, such as e.g. methylfuranthiol; and pyrazines and pyrrolines, such as e.g. methylpyrazine, acetylpyrazine, 2-propionylpyrroline and 2-acetylpyrroline.

The aroma composition can also be employed in the form of reaction aromas (Maillard products) and/or extracts or essential oils from plants or plant parts or fractions thereof.

A further preferred composition according to the invention which is suitable for consumption and comprises a mixture according to the invention or a powder according to the invention is a water-in-oil (W/O) emulsion. Alongside the mixture according to the invention or the powder according to the invention, such an emulsion comprises water, an oily phase, one or more W/O emulsifiers, optionally one or more antioxidants and optionally one or more substances for intensifying an antioxidative action.

Preferably, such a composition (W/O emulsion) according to the invention comprises 1 to 12 wt. %, preferably 3 to 10 wt. % of a mixture according to the invention or a powder according to the invention, 5 to 30 wt. %, preferably 8 to 25 wt. % of water, 50 to 90 wt. %, preferably 60 to 80 wt. % of an oily phase, 0.1 to 5 wt. % of a W/O emulsifier which can be consumed and optionally one or more antioxidants and optionally one or more substances for intensifying an antioxidative action.

Such a W/O emulsion according to the invention particularly preferably comprises the constituents mentioned in the amounts mentioned.

The oily phase of such a W/O emulsion according to the invention preferably comprises (or consists of) a fatty oil and/or an aroma composition. Oily phases comprising or consisting of a fatty oil and an aroma composition are preferred.

Suitable fatty oils are, for example, edible oils, in particular plant oils. Suitable fatty oils are, for example, borage oil, thistle oil, groundnut oil, hazelnut oil, coconut oil, calabash oil, linseed oil, maize germ oil, macadamia nut oil, almond oil, olive oil, palm kernel oil, pecan nut oil, pistachio kernel oil, rape oil, rice germ oil, sesame oil, soya oil, sunflower oil, walnut oil or wheat germ oil, or fractions obtainable therefrom. It is also possible to use liquid neutral esters based on medium-chain fatty acids and glycerol, such as, for example, Miglyols (e.g. Miglyol 810, Miglyol 812). Sunflower oil, palm kernel oil and rape oil are preferred. Fractionated coconut oils which chiefly contain C6-C8 fatty acid radicals are furthermore preferably used. These are distinguished by their neutral taste and by their good stability to oxidation.

The W/O emulsifier which can be consumed is preferably chosen from the group consisting of lecithin (E 322), mono- and diglycerides of edible fatty acids (E 471), acetic acid monoglycerides (E 472a), lactic acid monoglycerides (E 472b), citric acid monoglycerides (E 472c), tartaric acid monoglycerides (E 472d), diacetyltartaric acid monoglycerides (E 472e) and sorbitan monostearate (E 491).

Suitable antioxidants and substances which can intensify the antioxidative action are the naturally occurring tocopherols and derivatives thereof, tocotrienols, flavonoids, ascorbic acid and its salts, alpha-hydroxy acids (e.g. citric acid, lactic acid, malic acid, tartaric acid) and Na, K and Ca salts thereof, constituents, extracts or fractions thereof isolated from plants, e.g. from tea, green tea, algae, grape seeds, wheat germ, rosemary or oregano, flavonoids, quercetin and phenolic benzylamines. Propyl gallate, octyl gallate, dodecyl gallate, butylhydroxyanisole (BHA), butylhydroxytoluene (BHT), lecithins, mono- and diglycerides of edible fatty acids esterified with citric acid, orthophosphates and Na, K and Ca salts of monophosphoric acid and ascorbyl palmitate are furthermore suitable as antioxidants.

If a mixture according to the invention, a powder according to the invention or a composition according to the invention also comprises constituents which can be assigned to components (a)-(c), these constituents are also calculated in the determination of the contents of the particular components, and are not interpreted as further or other constituents of the mixture, the powder or the composition.

The W/O emulsions according to the invention are suitable in particular for application to surfaces of foodstuffs, the foodstuffs preferably having a water content of not more than 10 wt. %, preferably of not more than 5 wt. %. In a preferred embodiment, the W/O emulsion according to the invention has a sufficiently low viscosity at the application temperature, so that application of the W/O emulsion by means of spraying is possible. Preferred foodstuffs on to the surfaces of which a W/O emulsion according to the invention can be applied are, for example, crackers, crisps (e.g. based on potatoes, maize, cereal or bread), extruded nibble (snack) articles (e.g. flips) or pretzel products (e.g. salt sticks). W/O emulsions according to the invention are regularly applied to the surfaces of foodstuffs in an amount of from 0.5 to 5 wt. %, based on the total weight of the foodstuff.

The mixtures or powders according to the invention and the compositions according to the invention which are suitable for consumption and comprise such a mixture or such a powder (in particular, that is to say, the W/O emulsions according to the invention) can furthermore preferably comprise 0 to 3 wt. %, preferably 0.5 to 2 wt. % of a sweet-tasting mono- or disaccharide. Preferred sweet-tasting sugars are glucose (dextrose, grape sugar), sucrose, maltose and fructose. The salt taste of the mixtures, powders and compositions according to the invention was enhanced in the presence of one or more sweet-tasting mono- or disaccharides.

As already mentioned, a further aspect of the present invention relates to the use of a mixture according to the invention or a powder according to the invention for generating or enhancing a common salt taste.

Preferably, the mixtures and powders according to the invention are employed in (i) ready-to-eat formulations or (ii) semi-finished products which serve for nutrition or consumption for pleasure, in particular in reduced-sodium formulations which serve for nutrition or consumption for pleasure.

In this context, the term "reduced-sodium" means that the formulation or semi-finished product according to the invention contains significantly less sodium, in particular in the form of sodium chloride (common salt) and/or sodium glutamate, than is contained in the conventional formulation or semi-finished product; the sodium content here is about 5 to 90 wt. %, preferably 10 to 50 wt. %, particularly preferably 20 to 50 wt. % below the sodium content of the normal formulation.

Ready-to-eat formulations according to the invention which serve for nutrition or consumption for pleasure preferably comprise a mixture according to the invention or a powder according to the invention in an amount in the range of from 0.001 wt. % to 10 wt. %, preferably in the range of from 0.01 wt. % to 5 wt. %, particularly preferably in the range of from 0.1 wt. % to 3 wt. %, based on the total weight of the ready-to-use or -eat formulation.

Semi-finished products according to the invention which serve for nutrition or consumption for pleasure preferably comprise a mixture according to the invention or a powder according to the invention in an amount in the range of from 1 wt. % to 80 wt. %, preferably in the range of from 5 wt. % to 75 wt. %, particularly preferably in the range of from 10 wt. % to 70 wt. %, based on the total weight of the semi-finished product.

Reduced-sodium formulations according to the invention which comprise at least one sodium salt, preferably sodium chloride, wherein the amount of the sodium salt is not sufficient to be perceived as a satisfactorily salty taste in a comparison formulation which does not comprise a mixture according to the invention but is of otherwise identical composition (normal reduced-sodium formulation), and the amount of the mixture according to the invention is sufficient to sensorially enhance the salty taste impression of the sodium salt are particularly relevant.

In the context of the invention, formulations which serve for nutrition or consumption for pleasure are e.g. baked goods (e.g. bread, dry biscuits, cakes, other baked products), confectionery (e.g. chocolate, chocolate bar products, other bar products, fruit gum, hard and soft caramels, chewing gum, coatings, e.g. for confectionery products, cereals or baked products), alcoholic or non-alcoholic drinks (e.g. coffee, tea, wine, wine-containing drinks, beer, beer-containing drinks, liqueurs, schnapps, brandies, fruit-containing carbonated drinks, isotonic drinks, refreshing drinks, nectars, fruit and vegetable juices, fruit or vegetable juice formulations), instant drinks (e.g. instant cocoa drinks, instant tea drinks, instant coffee drinks, instant fruit drinks, instant vegetable drinks), meat products (e.g. ham, fresh sausage or uncooked sausage formulations, seasoned or marinated fresh or salted meat products), eggs or egg products (dried egg, egg white, egg yolk), cereal products (e.g. breakfast cereals, muesli bars, precooked ready-made rice products, rice flour products, millet and sorghum products, uncooked or precooked noodles and pasta products), dairy products (e.g. milk drinks, milk ice, yoghurt, kefir, fresh cheese, soft cheese, hard cheese, dried milk powder, whey, butter, buttermilk, products containing partly or completely hydrolysed milk protein), products from soya protein or other soya bean fractions (e.g. soya milk and products produced therefrom, soya lecithin-containing formulations, fermented products, such as tofu or tempe or products produced therefrom, soya sauces), fruit formulations (e.g. preserves, fruit-flavoured ice-cream, fruit sauces, fruit fillings), vegetable formulations (e.g. ketchup, sauces, dried vegetables, frozen vegetables, precooked vegetables, vegetables preserved in vinegar, vegetable concentrates or pastes, cooked vegetables, potato formulations), nibbles (e.g. baked or fried potato crisps or potato paste products, bread dough products, extrudates based on maize, rice or groundnuts), fat- and oil-based products or emulsions thereof (e.g. mayonnaise, remoulade, dressings, seasoning formulations), other ready-made dishes and soups (e.g. dried soups, instant soups, precooked soups), spices or spice formulations (e.g. mustard formulations, horseradish formulations), spice mixtures and, in particular, sprinkling spices (seasonings), which are used, for example, in the snacks sector.

Particularly preferred formulations are formulations (of reduced common salt content) which contain common salt and which serve for nutrition or consumption for pleasure, e.g. baked goods (e.g. bread, dry biscuits, cakes, other baked products), vegetable juice formulations, meat products (e.g. ham, fresh sausage or uncooked sausage formulations, seasoned or marinated fresh or salted meat products), eggs or egg products (dried egg, egg white, egg yolk), cereal products (e.g. precooked ready-made rice products, uncooked or precooked noodles and pasta products), dairy products (e.g. milk drinks, milk ice, yoghurt, kefir, fresh cheese, soft cheese, hard cheese, dried milk powder, whey, butter, buttermilk, products containing partly or completely hydrolysed milk protein), products from soya protein or other soya bean fractions (e.g. soya milk and products produced therefrom, soya lecithin-containing formulations, fermented products, such as tofu or tempe or products produced therefrom, soya sauces), vegetable formulations (e.g. ketchup, sauces, dried vegetables, frozen vegetables, precooked vegetables, vegetables preserved in vinegar, cooked vegetables, potato formulations), nibbles (e.g. baked or fried potato crisps or potato paste products, bread dough products, extrudates based on maize or groundnuts), fat- and oil-based products or emulsions thereof (e.g. mayonnaise, remoulade, dressings, seasoning formulations), ready-made dishes, soups (e.g. dried soups, instant soups, precooked soups), sauces (instant sauces, dried sauces, ready-made sauces), spices, seasoning mixtures and, in particular, sprinkling spices (seasonings), which are used, for example, in the snacks sector.

The formulations in the context of the invention can also be in the form of capsules, tablets (non-coated and coated tablets, e.g. coatings which are resistant to gastric juice), lacquered tablets, granules, pellets, solid mixtures, dispersions in liquid phases, emulsions, powders, solutions, pastes or other formulations which can be swallowed or chewed, e.g. as food supplements.

The semi-finished products according to the invention as a rule serve for the preparation of ready-to-use or -eat formulations which serve for nutrition or consumption for pleasure.

In particular, semi-finished products according to the invention which serve for nutrition or consumption for pleasure can serve to enhance the salty taste of foodstuffs and compositions for consumption for pleasure of reduced common salt content, and also directly as seasonings for industrial or non-industrial formulation of foodstuffs and/or compositions for consumption for pleasure.

Semi-finished products according to the invention preferably comprise 1 wt. % to 80 wt. %, preferably 5 to 75 wt. %, in particular 10 wt. % to 70 wt. % of mixtures or powders according to the invention, a content of from 0.0001 to 50 wt. %, preferably 0.001 to 20 wt. %, in particular 0.01 wt. % to 5 wt. % of sodium chloride, and optionally a content of from 0.0001 wt. % to 90 wt. %, preferably 0.001 wt. % to 30 wt. % of an aroma composition, in each case based on the total weight of the semi-finished product.

The mixtures and powders according to the invention and likewise the formulations and semi-finished products according to the invention are preferably prepared by a procedure in which the substances contained in components (a), (b) and (c) and where appropriate (d) are dissolved and mixed in optionally demineralized and/or purified water; the solutions are then converted into a formulation which is (at least virtually) solid by a drying process, preferably a spray drying, vacuum freeze drying, reverse osmosis, evaporation or other concentration process or a combination of the processes mentioned. In this context, the drying can take place with the aid of carrier substances (e.g. starch, starch derivatives, maltodextrin, silica gel, see above) or auxiliary substances (e.g. plant gums, stabilizing agents). The drying is preferably carried out by means of spray drying or vacuum freeze drying.

A preparation process in which certain precursors of the substances contained in components (a), (b) and (c) are dissolved in water and converted by reaction with selected reaction partners into the individual substances to be employed is an alternative and is likewise preferred. In particular, the polybasic food acids themselves can initially be employed, instead of the salts to be employed; these acids are then reacted with a base in aqueous solution, so that the mono- or polyvalent salt such as is to be employed in component (b) is formed, in the context see also the examples.

According to a further preferred embodiment, for the preparation of formulations or semi-finished products according to the invention, mixtures or powders according to the invention and optionally other constituents are first incorporated into emulsions, into liposomes (e.g. starting from phosphatidylcholine), into microspheres, into nanospheres or also into capsules, granules or extrudates of a matrix which is suitable for foodstuffs and compositions for consumption for pleasure (e.g. of starch, starch derivatives, cellulose or cellulose derivatives, such as hydroxypropylcellulose, other polysaccharides, such as alginate, natural fats, natural waxes, such as beeswax or carnauba wax, or of proteins, such as gelatine).

The mixtures according to the invention can be of natural origin or comprise substances of natural origin. Such substances can be obtained e.g. from fresh or dried mineral-containing plant parts by aqueous extraction with subsequent freeze or spray drying of the aqueous solutions. Fresh or dried mineral-containing plant parts can be e.g. celery varieties (root celery, stalk celery), onions or mustard (yellow mustard, black mustard, white mustard). It is advantageous here to free the plant parts from aroma-imparting constituents beforehand, e.g. by extraction with lipophilic solvent and/or steam distillation.

In a further preferred preparation process, the mixtures or powders according to the invention are complexed with one or more suitable complexing agents, for example with cyclodextrins or cyclodextrin derivatives, preferably alpha- or beta-cyclodextrin, and are employed in this complexed form.

Formulations according to the invention in which the matrix is chosen such that the mixtures according to the invention are released from the matrix in delayed form, so that a long-lasting action is obtained, are particularly preferred. As the matrix there may be used here e.g. natural fats, natural waxes (e.g. beeswax, carnauba wax) or also natural ballast substances (wheat fibres, apple fibres, oat fibres, orange fibres).

Further constituents of a ready-to-eat formulation or semi-finished product according to the invention which serves for nutrition or consumption for pleasure can be conventional base substances, auxiliary substances and additives for foodstuffs or compositions for consumption for pleasure, e.g. water, mixtures of fresh or processed, plant or animal base substances or raw materials (e.g. uncooked, roasted, dried, fermented, smoked and/or boiled meat, bone, cartilage, fish, vegetables, fruit, herbs, nuts, vegetable or fruit juices or pastes or mixtures thereof), digestible or non-digestible carbohydrates (e.g. sucrose, maltose, fructose, glucose, dextrins, amylose, amylopectin, inulin, xylans, cellulose, tagatose), sugar alcohols (e.g. sorbitol, erythritol), natural or hydrogenated fats (e.g. tallow, lard, palm fat, coconut fat, hydrogenated plant fat), oils (e.g. sunflower oil, groundnut oil, maize germ oil, olive oil, fish oil, soya oil, sesame oil), fatty acids or salts thereof (e.g. potassium stearate), proteinogenic or non-proteinogenic amino acids and related compounds (e.g. γ-aminobutyric acid, taurine), peptides (e.g. glutathione), native or processed proteins (e.g. gelatine), enzymes (e.g. peptidases), nucleic acids, nucleotides, taste correctants for unpleasant taste impressions, further taste modulators for further, as a rule not unpleasant taste impressions, other taste-modulating substances (e.g. inositol phosphate, nucleotides, such as guanosine monophosphate, adenosine monophosphate or other substances, such as sodium glutamate or 2-phenoxypropionic acid), emulsifiers (e.g. lecithins, diacylglycerols, gum arabic), stabilizers (e.g. carrageenan, alginate), preservatives (e.g. benzoic acid and salts thereof, sorbic acid and salts thereof), antioxidants (e.g. tocopherol, ascorbic acid), chelating agents (e.g. citric acid), organic or inorganic acidifying agents (e.g. acetic acid, phosphoric acid), additional bitter principles (e.g. quinine, caffeine, limonin, amarogentin, humulones, lupulones, catechols, tannins), substances which prevent enzymatic browning (e.g. sulfite, ascorbic acid), essential oils, plant extracts, natural or synthetic dyestuffs or coloured pigments (e.g. carotenoids, flavonoids, anthocyans, chlorophyll and derivatives thereof), spices, substances having a trigeminal action or plant extracts comprising such substances having a trigeminal action, synthetic, natural or nature-identical aroma substances or odoriferous substances and odour correctants.

Preferably, compositions, formulations or semi-finished products according to the invention comprise an aroma composition in order to round off and refine the taste and/or smell.

A composition according to the invention which comprises a solid carrier substance and an aroma composition as further constituents has already been described above. Suitable aroma compositions comprise e.g. synthetic, natural or nature-identical aroma, odoriferous and flavouring substances, reaction aromas, smoke aromas or other aroma-imparting formulations (e.g. protein [partial] hydrolysates, grill aromas, plant extracts, spices, spice formulations, vegetables and/or vegetable formulations) and suitable auxiliary and carrier substances. In particular, the aroma compositions which are not according to the invention or constituents thereof which cause a roasted, meaty (in particular chicken, fish, marine animal, beef, pork, lamb, sheep, goat), vegetable-like (in particular tomato, onion, garlic, celery, leek, mushroom, aubergine, seaweed), a seasoned (in particular black and white pepper, chilli, paprika, cardamom, nutmeg, pimento, mustard and mustard products), fried, yeasty, boiled, fatty, salty and/or piquant aroma impression and can thus enhance the seasoned impression are suitable here. As a rule, the aroma compositions comprise more than one of the constituents mentioned.

In a further embodiment of the present invention, the mixtures or powders according to the invention are used in the compositions, formulations and semi-finished products according to the invention in combination with at least one (further, not in itself according to the invention) substance for masking or reducing an unpleasant (bitter, metallic, chalky, sour, astringent) taste impression or for enhancing a pleasant taste impression (sweet, salty, umami). An enhancement of the taste, in particular of the salty taste, can be achieved in this manner. These further substances can be chosen from the following list, without limiting the invention therewith: nucleotides (e.g. adenosine 5'-monophosphate, cytidine 5'-monophosphate) or pharmaceutically acceptable salts thereof, lactisols, hydroxyflavanones (e.g. eriodictyol, homo-eriodictyol or sodium salts thereof), in particular according to EP 1 258 200, hydroxybenzoic acid amides (e.g. 2,4-dihydroxybenzoic acid vanillylamide, 4-hydroxybenzoic acid vanillylamide), or mixtures of whey proteins with lecithins.

It can be seen from the above text that the present invention also relates to a method for generating or enhancing the common salt taste in a (i) ready-to-use or -eat formulation or (ii) semi-finished product which serves for nutrition or consumption for pleasure. Such a method according to the invention comprises the following step:

Mixing of an amount which is active in terms of taste of a mixture according to the invention or a powder according to the invention with one or more further constituents of the (i) ready-to-eat formulation or the (ii) semi-finished product or application of an amount which is active in terms of taste of a mixture according to the invention or a powder according to the invention to one or more further constituents of the (i) ready-to-eat formulation or the (ii) semi-finished product or embedding of an amount which is active in terms of taste of a mixture according to the invention or a powder according to the invention in a covering or matrix material.

The invention will now be explained in more detail in the following with the aid of examples. Further aspects of the present invention emerge from the attached patent claims.

EXAMPLES

Unless stated otherwise, all the data relate to the weight. The sensorial evaluation by means of tasting of the mixtures according to the invention was carried out in the form of a 0.5 wt. % aqueous solution by a group of experts.

Example 1

Mixtures for Enhancing the Salt Taste

The following table shows some examples of mixtures according to the invention.

| | Mixture | | | | | | | |
|---|---|---|---|---|---|---|---|---|
| | 1 | 2 | 3 | 4 | 5 | 6 | 7 | 8 |
| Constituent | Content [%] | | | | | | | |
| Dipotassium malate | | | 66.50 | | | | | |
| D,L-Malic acid | 28.34 | 29.00 | | 28.80 | 28.34 | 28.17 | 28.54 | |
| Potassium malate 50% in $H_2O$ | | | | | | | | 82.84 |
| $CaCl_2 * 2H_2O$ | 6.35 | 6.50 | 11.50 | 6.46 | 6.35 | 6.31 | 6.40 | 5.92 |
| $MgCl_2 * 6H_2O$ | 7.13 | 7.30 | 13.07 | 7.25 | 7.13 | 7.09 | 7.19 | 6.65 |
| $KH_2PO_4$ | 2.10 | 2.15 | 3.80 | 2.14 | 2.10 | 2.09 | 2.12 | 1.96 |
| Edible salt (NaCl) | | 8.30 | | | | | | |
| L-Aspartic acid | 0.19 | 0.19 | 0.30 | 0.19 | 0.19 | 0.18 | 1.08 | 0.17 |
| L-Glutamine | 0.88 | 0.90 | 1.60 | 0.89 | 0.88 | 0.87 | 0.89 | 0.82 |
| L-Valine | 0.15 | 0.15 | 0.28 | 0.15 | 0.15 | 0.15 | 0.15 | 0.14 |
| L-Asparagine | 1.61 | 1.65 | 2.95 | | | | | 1.50 |
| L-Arginine | | | | | 1.61 | | | |
| L-Glutamic acid | | | | | | 2.19 | | |
| Potassium hydroxide solution (approx. 45%) | 53.25 | | | 54.12 | 53.25 | 52.95 | 53.63 | |
| $KHCO_3$ | | 43.86 | | | | | | |
| Total: | 100 | 100 | 100 | 100 | 100 | 100 | 100 | 100 |

The substances were dissolved together in water and the solution was then freeze dried to dryness.

The resulting dried, solid mixtures were tasted in the form of a 0.5 wt. % strength aqueous solution by a group of experts.

| Mixture | Sensorial description for a 0.5% aqueous solution |
|---|---|
| 1 | salty, not very sourish |
| 2 | salty, slight sour note |
| 3 | salty, not very sourish |
| 4 | salty, not very sourish |
| 5 | salty, fullness in mouth, neutral |
| 6 | salty, sweetish, meaty, vegetable-like |
| 7 | salty, sweetish, meaty, vegetable-like |
| 8 | salty, hearty, neutral |

Example 2

Mixture for Enhancing the Salt Taste and Industrial Preparation Thereof

| Part | Constituent | Content |
|---|---|---|
| A | D,L-Malic acid | 290.0 g |
| B | $CaCl_2 * 2H_2O$ | 65.0 g |
| | $MgCl_2 * 6H_2O$ | 73.0 g |
| | $KH_2PO_4$ | 21.5 g |
| | Sodium chloride | 83.0 g |
| C | L-Aspartic acid | 1.9 g |
| | L-Glutamine | 9.0 g |
| | L-Valine | 1.5 g |
| | L-Asparagine | 16.5 g |
| D | Potassium bicarbonate | 438.6 g |

Each block A-D was weighed out separately. 4 l of water were initially introduced into the mixing vessel and block A was added and dissolved, while stirring; the salts from block B were first added to the solution, and then the amino acids from block C. Finally, the potassium bicarbonate was metered cautiously into the solution, carbon dioxide escaping. The solution is diluted to 10 l and then freeze dried (eutectic point: −15° C.; working vacuum: 0.52 mbar; standing surface temperature: −5° C. to +25° C.). Yield 650 g of white powder.

Tasting: Salty, with a slight sour note

Example 3

Mixture for Enhancing the Salt Taste and Industrial Preparation Thereof

| Part | Constituent | Content |
|---|---|---|
| A | Potassium malate 50% strength in $H_2O$ | 91.0 g |
| B | $CaCl_2 * 2H_2O$ | 6.50 g |
| | $MgCl_2 * 6H_2O$ | 7.30 g |
| | $KH_2PO_4$ | 2.15 g |
| | Sodium chloride | 8.30 g |
| C | L-Aspartic acid | 0.19 g |
| | L-Glutamine | 0.90 g |
| | L-Valine | 0.15 g |
| | L-Asparagine | 1.65 g |

Each block A-C was weighed out separately. 290 ml of water were initially introduced into the mixing vessel and block A was added and dissolved, while stirring; the salts from block B were first added to the solution, and then the amino acids from block C. The solution is diluted with water to 1.84 kg (pH 6.0) and then freeze dried (eutectic point: −15°

C.; working vacuum: 0.52 mbar; standing surface temperature: −5° C. to +25° C.). Yield 67.2 g of white powder.

Example 4

Sodium-Free Mixture with Maltodextrin as a Carrier for Enhancing the Salt Taste and Industrial Preparation Thereof

| Part | Constituent | Content |
|---|---|---|
| A | D,L-Malic acid | 29 g |
| B | $CaCl_2 * 2H_2O$ | 6.50 g |
|  | $MgCl_2 * 6H_2O$ | 7.30 g |
|  | $KH_2PO_4$ | 2.15 g |
|  | Maltodextrin DE 10 from potatoes | 8.30 g |
| C | L-Aspartic acid | 0.19 g |
|  | L-Glutamine | 0.90 g |
|  | L-Valine | 0.15 g |
|  | L-Asparagine | 1.65 g |
| D | Potassium bicarbonate | 43.9 g |

Each block A-C was weighed out separately. 300 ml of water were initially introduced into the mixing vessel and block A was added and dissolved, while stirring; the salts and maltodextrin from block B were first added to the solution, and then the amino acids from block C. Finally, block D was added in portions, carbon dioxide escaping. The solution is diluted with water to 1.84 kg (pH 6.0) and then freeze dried (eutectic point: −15° C.; working vacuum: 0.52 mbar; standing surface temperature: −5° C. to +25° C.). Yield 74.7 g of white powder.

Example 5

Sodium-Free Mixture for Enhancing the Salt Taste and Industrial Preparation Thereof

| Part | Constituent | Content |
|---|---|---|
| A | L-Malic acid | 2.9 g |
| B | $CaCl_2 * 2H_2O$ | 0.65 g |
|  | $MgCl_2 * 6H_2O$ | 0.73 g |
|  | $KH_2PO_4$ | 0.215 g |
| C | L-Aspartic acid | 0.019 g |
|  | L-Glutamine | 0.09 g |
|  | L-Valine | 0.015 g |
|  | L-Asparagine | 0.165 g |
| D | Potassium bicarbonate | 4.386 g |

The preparation was carried out analogously to Example 4.

Example 6

Lysine-Containing Mixture for Enhancing the Salt Taste and Industrial Preparation Thereof

| Part | Constituent | Content |
|---|---|---|
| A | D,L-Malic acid | 290.0 g |
| B | $CaCl_2 * 2H_2O$ | 65.0 g |
|  | $MgCl_2 * 6H_2O$ | 73.0 g |
|  | $KH_2PO_4$ | 21.5 g |
|  | Sodium chloride | 83.0 g |
| C | L-Aspartic acid | 1.9 g |
|  | L-Glutamine | 9.0 g |
|  | L-Valine | 1.5 g |
|  | L-Asparagine | 16.5 g |
| D | Potassium bicarbonate | 438.6 g |
| E | Silicon dioxide (silica gel) | 8.6 g |
|  | L-Lysine | 112 g |

Blocks A-D were processed analogously to Example 2 and finally mixed with block E, and the mixture was homogenized in a mortar and Grindomix. For technological reasons, the amino acid L-lysine is employed in block F and not together with the other amino acids in block C. However, the amino acids together form component (c).

Tasting: almost purely salty, slightly sweetish note

Example 7

Lysine Monohydrochloride-Containing Mixture for Enhancing the Salt Taste and Industrial Preparation Thereof

| Part | Constituent | Content |
|---|---|---|
| A | D,L-Malic acid | 290.0 g |
| B | $CaCl_2 * 2H_2O$ | 65.0 g |
|  | $MgCl_2 * 6H_2O$ | 73.0 g |
|  | $KH_2PO_4$ | 21.5 g |
|  | Sodium chloride | 83.0 g |
| C | L-Aspartic acid | 1.9 g |
|  | L-Glutamine | 9.0 g |
|  | L-Valine | 1.5 g |
|  | L-Asparagine | 16.5 g |
| D | Potassium bicarbonate | 438.6 g |
| E | Silicon dioxide (silica gel) | 8.6 g |
|  | L-Lysine monohydrochloride | 145 g |

For technological reasons, the amino acid L-lysine is employed in block E and not together with the other amino acids in block C. However, the amino acids together form component (c).

The preparation is carried out analogously to Example 6.

Tasting: almost purely salty, slight bouillon note

Example 8

Seasoning, Containing a Mixture for Enhancing the Salt Taste and an Aroma Composition

| Part | Constituent | Content |
|---|---|---|
| A | Potassium malate 50% strength in $H_2O$ | 91.0 g |
| B | $CaCl_2 * 2H_2O$ | 6.50 g |
|  | $MgCl_2 * 6H_2O$ | 7.30 g |
|  | $KH_2PO_4$ | 2.15 g |
|  | Sodium chloride | 8.30 g |
| C | L-Aspartic acid | 0.19 g |
|  | L-Glutamine | 0.90 g |
|  | L-Valine | 0.15 g |
|  | L-Asparagine | 1.65 g |
| D | Ground mustard seeds | 5 g |
|  | Mustard aroma | 0.1 g |

Each block A-C was weighed out separately. 290 ml of water were initially introduced into the mixing vessel and block A was added and dissolved, while stirring; the salts from block B were first added to the solution, and then the amino acids from block C. The solution is diluted with water to 1.84 kg (pH 6.0) and then freeze dried (eutectic point: −15° C.; working vacuum: 0.52 mbar; standing surface temperature: −5° C. to +25° C.). The product is mixed with ground mustard seeds and the mustard aroma from block D and made up into a seasoning.

Example 9

Dextrose-Containing, Sodium-Free Mixture for Enhancing the Salt Taste and Preparation Thereof

| Part | Constituent | Content |
|---|---|---|
| A | D,L-Malic acid | 128.3 g |
| B | CaCl$_2$ * 2H$_2$O | 28.8 g |
|   | MgCl$_2$ * 6H$_2$O | 32.3 g |
|   | KH$_2$PO$_4$ | 9.5 g |
|   | Dextrose monohydrate | 10.6 g |
| C | L-Aspartic acid | 0.8 g |
|   | L-Glutamine | 4.0 g |
|   | L-Valine | 0.7 g |
|   | L-Arginine | 7.3 g |
| D | Potassium hydroxide solution approx. 45% | 221.3 g |
| E | Maltodextrin DE 10 | 719.4 g |
| F | Lysine monohydrochloride | 143.5 g |

Each block A-C was weighed out separately. 1,337.0 g of water were initially introduced into the mixing vessel and block A was added and dissolved, while stirring; the salts and dextrose monohydrate from block B were first added to the solution, and then the amino acids from block C. Thereafter, block D was added slowly. Finally, block E was added and the solution was stirred until it was clear (pH<7.0). The solution was then spray dried (entry temperature 180° C., exit temperature 80° C., residual moisture content<5%, particle size 30-300 μm). Yield: 1,048 g of white powder. The powder obtained is mixed with block F.

For technological reasons, the amino acid L-lysine is employed in block F and not together with the other amino acids in block C. However, the amino acids together form component (c).

Tasting: almost purely salty, slight bouillon note

Example 10

Fructose-Containing, Sodium-Free, Lysine Monohydrochloride-Containing Mixture for Enhancing the Salt Taste

| Part | Constituent | Content |
|---|---|---|
| A | D,L-Malic acid | 129.5 g |
| B | CaCl$_2$ * 2 H$_2$O | 29.0 g |
|   | MgCl$_2$ * 6 H$_2$O | 32.16 g |
|   | KH$_2$PO$_4$ | 9.5 g |
|   | Fructose | 10.6 g |
| C | L-Aspartic acid | 0.8 g |
|   | L-Glutamine | 4.0 g |
|   | L-Valine | 0.7 g |
|   | L-Arginine | 7.4 g |
|   | Lysine monohydrochloride | 151.8 g |
| D | Potassium hydroxide solution approx. 45% | 223.3 g |
|   | Water | 1,432.0 g |
| E | Maltodextrin DE 10 | 719.4 g |

Each block A-C was weighed out separately. 1,432.0 g of water were initially introduced into the mixing vessel and block A was added and dissolved, while stirring; the salts and fructose from block B were first added to the solution, and then the amino acids and hydrochlorides thereof from block C. Thereafter, block D was added slowly. Finally, block E was added and the solution was stirred until it was clear (pH<7.0). The solution was then spray dried (entry temperature 180° C., exit temperature 80° C. (residual moisture content<5%, particle size 30-300 μm). Yield: 1,172 g of white-yellowish powder.

Tasting: almost purely salty, slight bouillon and vegetable note

Use Example 1

Boullion

| Constituent | Comparison formulation A | Comparison formulation B | Reduced-salt formulation C |
|---|---|---|---|
| Fat powder | 8.77 g | 8.77 g | 8.77 g |
| Sodium glutamate | 8.77 g | 8.77 g | 8.77 g |
| Yeast extract powder | 12.28 g | 12.28 g | 12.28 g |
| Common salt | 29.83 g | 19.24 g | 17.54 g |
| Maltodextrin | 37.28 g | 37.28 g | 37.28 g |
| Natural vegetable extract | 3.07 g | 3.07 g | 3.07 g |
| Mixture according to Example 2 | — | — | 12.28 g |

Formulations B and C show no noticeable difference in respect of the NaCl content.

In each case 1,000 ml of hot water were poured on to 15 g of the particular powder mixture. For the evaluation, the formulations were tasted by 5 to 8 people and the saltiness was evaluated with the aid of a scale from 0 (no salt perceived) to 9 (extremely salty). The aqueous comparison solutions containing only sodium chloride which are listed in the following table were used as reference samples for the saltiness.

| NaCl in % | | | | | | | | | |
|---|---|---|---|---|---|---|---|---|---|
| 0 | 0.3 | 0.5 | 0.7 | 0.9 | 1.1 | 1.2 | 1.3 | 1.4 | 1.5 |
| Intensity 0 | 1 | 2 | 3 | 4 | 5 | 6 | 7 | 8 | 9 |

Each formulation to be evaluated was tested individually against the comparison solutions of the reference series.

|  | Comparison formulation A | Comparison formulation B | Reduced-salt formulation C |
|---|---|---|---|
| Saltiness (0-9) | 3.3 ± 0.7 | 2.1 ± 0.7 | 3.1 ± 0.8 |

Use Example 2

Seasoning Mixture for Potato Crisps 30% Reduced Salt

| Constituent | Comparison formulation A | Comparison formulation B | Reduced-salt formulation C |
|---|---|---|---|
| Sodium glutamate | 3.50 g | 3.50 g | 3.50 g |
| Cheese powder | 10.00 g | 10.00 g | 10.00 g |
| Garlic powder | 2.00 g | 2.00 g | 2.00 g |
| Whey powder | 38.86 g | 38.86 g | 38.86 g |
| Seasoning extract oil | 0.20 g | 0.20 g | 0.20 g |
| Paprika powder | 9.80 g | 9.80 g | 9.80 g |
| Common salt | 21.00 g | 14.97 | 14.00 g |
| Tomato powder | 9.00 g | 9.00 g | 9.00 g |
| Dry aroma | 2.50 g | 2.50 g | 2.50 g |
| Silicon dioxide | 0.02 g | 0.02 g | 0.02 g |
| Plant oil | 0.02 g | 0.02 g | 0.02 g |
| Onion powder | 3.00 g | 3.00 g | 3.00 g |
| Cream aroma concentrate | 0.03 g | 0.03 g | 0.03 g |
| Cheese aroma | 0.03 g | 0.03 g | 0.03 g |
| Tomato aroma concentrate | 0.04 g | 0.04 g | 0.04 g |
| Mixture according to Example 2 | | | 7.00 g |

Formulations B and C show no noticeable difference in respect of the NaCl content.

6 g of the seasoning mixture were absorbed on to 94 g of potato crisps. The saltiness was evaluated analogously to Use Example 1.

| | Comparison formulation A | Comparison formulation B | Reduced-salt formulation C |
|---|---|---|---|
| Saltiness (0-9) | 3.6 ± 0.6 | 2.3 ± 0.8 | 3.6 ± 0.6 |

Use Example 3

White Sauce

| Constituent | Comparison formulation A | Comparison formulation B | Reduced-salt formulation C |
|---|---|---|---|
| Maltodextrin | 26.28 g | 26.28 g | 26.28 g |
| Common salt | 7.50 g | 5.35 g | 5.00 g |
| Sodium glutamate | 2.00 g | 2.00 g | 2.00 g |
| Plant fat | 5.00 g | 5.00 g | 5.00 g |
| Pepper, white | 0.02 g | 0.02 g | 0.02 g |
| Onion powder | 1.50 g | 1.50 g | 1.50 g |
| Preglutinized maize starch | 30.00 g | 30.00 g | 30.00 g |
| Fat powder | 27.70 g | 27.70 g | 27.70 g |
| Mixture according to Example 2 | | | 2.50 g |

Formulations B and C show no noticeable difference in respect of the NaCl content.

1,000 ml of hot water were poured on to 90 g of the sauce mixture and the mixture was stirred vigorously with an egg whisk. The saltiness was evaluated analogously to Use Example 1.

| | Comparison formulation A | Comparison formulation B | Reduced-salt formulation C |
|---|---|---|---|
| Saltiness (0-9) | 3.8 ± 1.3 | 2.5 ± 0.5 | 3.5 ± 0.7 |

Use Example 4

Brown Sauce

| Constituent | Comparison formulation A | Comparison formulation B | Reduced-salt formulation C |
|---|---|---|---|
| Starch | 40.00 g | 40.00 g | 40.00 g |
| Maltodextrin | 33.10 g | 33.10 g | 33.10 g |
| Common salt | 6.00 g | 4.28 g | 4.00 g |
| Caramel, spray-dried | 5.00 g | 5.00 g | 5.00 g |
| Yeast extract powder | 3.00 g | 3.00 g | 3.00 g |
| Sodium glutamate | 2.00 g | 2.00 g | 2.00 g |
| Sugar | 0.50 g | 0.50 g | 0.50 g |
| Fat powder | 5.00 g | 5.00 g | 5.00 g |
| Tomato powder | 3.00 g | 3.00 g | 3.00 g |
| Natural vegetable extract | 1.00 g | 1.00 g | 1.00 g |
| Onion extract | 0.30 g | 0.30 g | 0.30 g |
| Pepper extract | 0.10 g | 0.10 g | 0.10 g |
| Dry aroma | 1.00 g | 1.00 g | 1.00 g |
| Mixture according to Example 2 | | | 2.00 g |

Formulations B and C show no noticeable difference in respect of the NaCl content.

1,000 ml of hot water were poured on to 90 g of the sauce mixture and the mixture was stirred vigorously with an egg whisk. The saltiness was evaluated analogously to Use Example 1.

| | Comparison formulation A | Comparison formulation B | Reduced-salt formulation C |
|---|---|---|---|
| Saltiness (0-9) | 5.6 ± 1.2 | 3.7 ± 1.0 | 5.0 ± 1.0 |

Use Example 5

Tomato Soup

| Constituent | Comparison formulation A | Comparison formulation B | Reduced-salt formulation C |
|---|---|---|---|
| Water | 50.65 g | 50.65 g | 50.65 g |
| Plant oil | 5.50 g | 5.50 g | 5.50 g |
| Tomato paste | 24.00 g | 24.00 g | 24.00 g |
| Cream | 1.05 g | 1.05 g | 1.05 g |
| Sugar | 2.00 g | 2.00 g | 2.00 g |
| Common salt | 1.70 g | 1.10 g | 1.00 g |
| Sodium glutamate | 0.40 g | 0.40 g | 0.40 g |
| Wheat flour | 5.50 g | 5.50 g | 5.50 g |
| Starch | 1.20 g | 1.20 g | 1.20 g |
| Diced tomatoes | 8.00 g | 8.00 g | 8.00 g |
| Mixture according to Example 2 | | | 0.70 g |

Formulations B and C show no noticeable difference in respect of the NaCl content.

The solid constituents were weighed out and mixed and the mixture was added to the water. The plant oil was metered in and the tomato paste was added. The mixture was boiled up, while stirring. The saltiness was evaluated analogously to Use Example 1.

|  | Comparison formulation A | Comparison formulation B | Reduced-salt formulation C |
|---|---|---|---|
| Saltiness (0-9) | 5.4 ± 1.2 | 3.6 ± 0.7 | 5.4 ± 1.2 |

Use Example 6

Chicken Soup

| Constituent | Comparison formulation A | Comparison formulation B | Reduced-salt formulation C |
|---|---|---|---|
| Water | 71.37 g | 71.37 g | 71.37 g |
| Starch | 1.50 g | 1.50 g | 1.50 g |
| Yeast extract | 0.40 g | 0.40 g | 0.40 g |
| Onion powder | 0.30 g | 0.30 g | 0.30 g |
| Pepper | 0.03 g | 0.03 g | 0.03 g |
| Garlic powder | 0.05 g | 0.05 g | 0.05 g |
| Vegetable extract | 0.20 g | 0.20 g | 0.20 g |
| Common salt | 1.00 g | 0.50 g | 0.50 g |
| Chicken soup aroma | 0.15 g | 0.22 g | 0.15 g |
| Plant fat | 0.50 g | 0.50 g | 0.50 g |
| Chicken meat | 7.00 g | 7.00 g | 7.00 g |
| Vegetables for soup-making | 14.50 g | 14.50 g | 14.50 g |
| Noodles | 3.00 g | 3.00 g | 3.00 g |
| Mixture according to Example 2 |  |  | 0.50 g |

Formulations B and C show no noticeable difference in respect of the NaCl content.

The solid constituents were weighed out and mixed and the mixture was added to the water. The chicken fat was added, and the chicken meat, vegetables for soup-making and noodles were added. The mixture was boiled up, while stirring. The saltiness was evaluated analogously to Use Example 1.

|  | Comparison formulation A | Comparison formulation B | Reduced-salt formulation C |
|---|---|---|---|
| Saltiness (0-9) | 6.9 ± 1.4 | 4.2 ± 0.9 | 5.7 ± 1.1 |

Use Example 7

Salted Potato Crisps

| Constituent | Comparison formulation A | Comparison formulation B | Comparison formulation C | Reduced-salt formulation D | Reduced-salt formulation E | Reduced-salt formulation F | Reduced-salt formulation G |
|---|---|---|---|---|---|---|---|
| Potato crisps, unsalted | 100 g | 100 g | 100 g | 100 g | 100 g | 100 g | 100 g |
| Common salt | 1.5 g | 1.05 g | 0.75 g | 0.95 g | 0.58 g | 0.90 g | 0.49 g |
| Mixture according to Example 5 |  |  |  | 0.9 g | 1.5 g | 1.35 g | 2.25 g |

Formulations B, D and F and formulations C, E and G show no noticeable different in respect of the NaCl content.

For preparation of the particular formulation, common salt and/or a mixture according to the invention according to Example 5 were absorbed on to 100 g of heated unsalted potato crisps. The saltiness of the resulting potato crisps was evaluated analogously to Use Example 1.

| Constituent | Comparison formulation A | Comparison formulation B | Comparison formulation C | Reduced-salt formulation D | Reduced-salt formulation E | Reduced-salt formulation F | Reduced-salt formulation G |
|---|---|---|---|---|---|---|---|
| Saltiness (0-9) | 8.2 ± 1.2 | 6.1 ± 1.2 | 4.1 ± 0.9 | 7.5 ± 1.5 | 5.0 ± 1.2 | 8.3 ± 1.4 | 7.3 ± 1.3 |

Specific Embodiments

Specific embodiment one of the invention comprises a mixture comprising or consisting of:
(a) one or more inorganic salts which are suitable for nutrition and are not sodium chloride,
(b) one or more mono- or polyvalent salts of polybasic food acids,
(c) one or more amino acids, or salts thereof, which are suitable for nutrition.

Specific embodiment two of the invention comprises a mixture according to specific embodiment one, also comprising
(d) sodium chloride.

Specific embodiment three of the invention comprises a mixture according to one of specific embodiments one or two, comprising or consisting of:
(a) 1 to 50 wt. %, preferably 10 to 40 wt. % of one or more inorganic salts which are suitable for nutrition and are not sodium chloride,
(b) 10 to 90 wt. %, preferably 30 to 80 wt. %, particularly preferably 55 to 80 wt. % of one or more mono- or polyvalent salts of polybasic food acids,
(c) 0.1 to 30 wt. %, preferably 2 to 25 wt. % of one or more amino acids, or salts thereof, which are suitable for nutrition,
(d) 0 to 20 wt. %, preferably 0 to 15 wt. % of sodium chloride, in each case based on the dry mass of the mixture.

Specific embodiment four of the invention comprises a mixture according to one of specific embodiments one, two, or three, wherein components (a), (b) and (c) are sodium-free.

Specific embodiment five of the invention comprises a mixture according to one of specific embodiments one, two, three, or four, wherein in component (a) the inorganic salts which are suitable for nutrition and are not sodium chloride are chosen from the group consisting of potassium, calcium, magnesium and ammonium salts with mono- or polyvalent inorganic counter-anions, and mixtures thereof.

Specific embodiment six of the invention comprises, a mixture according to specific embodiment five, wherein the mono- or polyvalent inorganic counter-anions are chosen from the group consisting of phosphate, hydrogen phosphate, dihydrogen phosphate, pyrophosphate, hydrogen pyrophosphate, polyphosphate, chloride, carbonate, bicarbonate, sulfate, hydrogen sulfate, nitrite, nitrate and mixtures thereof.

Specific embodiment seven of the invention comprises a mixture according to specific embodiments five or six, wherein the inorganic salts which are suitable for nutrition and are not sodium chloride are chosen from the group consisting of anhydrous calcium chloride, calcium chloride dihydrate, calcium chloride hexahydrate, anhydrous magnesium chloride, magnesium chloride dihydrate, magnesium chloride hexahydrate, potassium dihydrogen phosphate and dipotassium hydrogen phosphate.

Specific embodiment eight of the invention comprises a mixture according to one of the preceding specific embodiments, wherein in component (b) the mono- or polyvalent salts of polybasic food acids are chosen from the group consisting of potassium, calcium, magnesium or ammonium salts of mono- or polyvalent anions of food acids.

Specific embodiment nine of the invention comprises a mixture according to specific embodiment eight, wherein the polybasic food acids are chosen from the group consisting of citric acid, succinic acid, fumaric acid, maleic acid, malic acid and isomers thereof, tartaric acid and isomers thereof, malonic acid, glutaric acid, mucic acid, hydroxycitric acid and all the possible stereoisomers of the abovementioned food acids, and are preferably chosen from the group consisting of succinic acid and D-, L- and D,L-malic acid.

Specific embodiment ten of the invention comprises a mixture according to specific embodiments eight or nine, wherein the mono- or polyvalent salts of polybasic food acids are chosen from the group consisting of potassium succinate, dipotassium succinate, potassium malate, dipotassium malate and mixtures thereof.

Specific embodiment eleven of the invention comprises a mixture according to one of the preceding specific embodiments, wherein in component (c) the amino acids, or salts, which are suitable for nutrition are proteinogenic L-amino acids or amino acids which are formed by primary or secondary metabolic pathways, or salts thereof.

Specific embodiment twelve of the invention comprises a mixture according to specific embodiment eleven, wherein the amino acids or salts are chosen from the group consisting of glycine, L-alanine, L-valine, L-leucine, L-isoleucine, L-phenylalanine, L-tyrosine, L-glutamine, L-glutamic acid, L-asparagine, L-aspartic acid, L-serine, L-threonine, L-cysteine, L-methionine, L-proline, L-lysine, L-arginine, L-tryptophan, L-histidine, L-pyrolysine, L-pyroglutamine, L4-trans-hydroxyproline, L-3-cis-hydroxyproline, L-homoserine, L-homocysteine, L-cystine, L-ornithine and L-citrulline, and are preferably chosen from the group consisting of L-glutamine, L-glutamic acid, L-asparagine, L-aspartic acid, L-valine, L-arginine, L-lysine and salts thereof.

Specific embodiment thirteen of the invention comprises a mixture according to one of the preceding specific embodiments three to twelve, comprising or consisting of:
(a) 1 to 50 wt. % of one or more potassium, calcium, magnesium and/or ammonium salts which have mono- or polyvalent inorganic counter-anions and are suitable for nutrition,
(b) 10 to 90 wt. % of one or more potassium, calcium, magnesium and/or ammonium salts of mono- or polyvalent anions of food acids,
(c) 0.1 to 30 wt. % of one or more proteinogenic L-amino acids or amino acids formed by primary or secondary metabolic pathways, or salts thereof, which are suitable for nutrition,
(d) 0 to 20 wt. % of sodium chloride, in each case based on the dry mass of the mixture.

Specific embodiment fourteen of the invention comprises a mixture according to specific embodiment thirteen, comprising or consisting of:
(a) 10 to 40 wt. % of one or more potassium, calcium, magnesium and/or ammonium salts which have mono- or polyvalent inorganic counter-anions and are suitable for nutrition,
(b) 30 to 80 wt. %, particularly preferably 55 to 80 wt. % of one or more potassium, calcium, magnesium and/or ammonium salts of mono- or polyvalent anions of food acids,
(c) 2 to 25 wt. % of one or more proteinogenic L-amino acids or amino acids formed by primary or secondary metabolic pathways, or salts thereof, which are suitable for nutrition,
(d) 0 to 15 wt. % of sodium chloride,
in each case based on the dry mass of the mixture.

Specific embodiment fifteen of the invention comprises a mixture according to specific embodiment thirteen or fourteen, wherein
component (a) comprises anhydrous calcium chloride, calcium chloride dihydrate, calcium chloride hexahydrate, anhydrous magnesium chloride, magnesium chloride dihydrate, magnesium chloride hexahydrate, potassium dihydrogen phosphate and/or dipotassium hydrogen phosphate, component (b) comprises potassium succinate, dipotassium succinate, potassium malate and/or dipotassium malate and component (c) comprises L-glutamine, L-glutamic acid, L-asparagine, L-aspartic acid, L-valine, L-arginine and/or L-lysine and/or salts thereof.

Specific embodiment sixteen of the invention comprises a mixture according to one of the preceding specific embodiments, wherein the content of components (a), (b) and (c) is in the range of from 50 to 100 wt. %, preferably 65 to 100 wt. %, particularly preferably in the range of from 80 to 100 wt. %, based on the dry mass of the mixture.

Specific embodiment seventeen of the invention comprises a mixture according to one of the preceding specific embodiments, wherein component (a) comprises at least three different inorganic salts which are suitable for nutrition and which are not sodium chloride and component (c) comprises at least three different amino acids, or salts thereof, which are suitable for nutrition.

Specific embodiment eighteen of the invention comprises a mixture according to one of the preceding specific embodiments, also comprising 0 to 3 wt. %, preferably 0.5 to 2 wt. % of a sweet-tasting mono- or disaccharide.

Specific embodiment nineteen of the invention comprises a powder which can be prepared by dissolving a mixture according to one of the preceding specific embodiments in water and drying the solution.

Specific embodiment twenty of the invention comprises a composition which is suitable for consumption, comprising a mixture according to one of specific embodiments one to eighteen or a powder according to specific embodiment nineteen and one or more further constituents which are suitable for consumption.

Specific embodiment 21 of the invention comprises a composition according to specific embodiment twenty, wherein the further constituents are:
  solid carrier substances or
  solid carrier substances and aroma compositions or
  water, an oily phase, one or more W/O emulsifiers, optionally one or more antioxidants and optionally one or more substances for intensifying an antioxidative action.

Specific embodiment 22 of the invention comprises a composition according to one of specific embodiments twenty and 21, also comprising a sweet-tasting mono- or disaccharide, a substance for masking or reducing an unpleasant taste impression and/or a substance for enhancing a pleasant taste impression.

Specific embodiment 23 of the invention comprises (i) Ready-to-use or -eat formulation or (ii) semi-finished product which serves for nutrition or consumption for pleasure, comprising a mixture according to one of specific embodiments one to eighteen, a powder according to specific embodiment nineteen or a composition according to one of specific embodiments twenty to 22.

Specific embodiment 24 of the invention comprises use of a mixture according to one of specific embodiments one to eighteen or a powder according to specific embodiment nineteen for generating or enhancing a common salt taste.

Specific embodiment 25 of the invention comprises a process for the preparation of a powder according to specific embodiment nineteen, having the following steps: dissolving of a mixture according to one of specific embodiments one to eighteen in water and drying of the solution.

Specific embodiment 26 of the invention comprises a process for generating or enhancing the common salt taste in a (i) ready-to-eat formulation or (ii) semi-finished product which serves for nutrition or consumption for pleasure, having the following step:

mixing of an amount which is active in terms of taste of a mixture according to one of specific embodiments one to eighteen or a powder according to specific embodiment nineteen with further constituents of the (i) ready-to-eat formulation or the (ii) semi-finished product or application of an amount which is active in terms of taste of a mixture according to one of specific embodiments one to eighteen or a powder according to specific embodiment nineteen to one or more further constituents of the (i) ready-to-eat formulation or the (ii) semi-finished product or embedding of an amount which is active in terms of taste of a mixture according to one of specific embodiments one to eighteen or a powder according to specific embodiment nineteen in a covering or matrix material.

What is claimed is:

1. A composition comprising:
   (a) 1 to 50 wt % of at least three different inorganic salts, wherein the inorganic salts are selected from the group consisting of anhydrous calcium chloride, calcium chloride dihydrate, calcium chloride hexahydrate, anhydrous magnesium chloride, magnesium chloride dihydrate, magnesium chloride hexahydrate, potassium dihydrogen phosphate and dipotassium hydrogen phosphate;
   (b) 10 to 90 wt % of one or more mono- or polyvalent salts of polybasic food acids, wherein the mono- or polyvalent salts of polybasic food acids are chosen from the group consisting of potassium succinate, dipotassium succinate, potassium malate, dipotassium malate and mixtures thereof;
   (c) 0.1 to 30 wt % of at least three different amino acids, or salts thereof, which are suitable for nutrition; and
   (d) 0 to 20 wt % of sodium chloride.

2. The composition according to claim 1, wherein in component (c) the amino acids, or salts, which are suitable for nutrition are proteinogenic L-amino acids or amino acids which are formed by primary or secondary metabolic pathways, or salts thereof.

3. The composition according to claim 2, wherein the amino acids or salts are selected from the group consisting of glycine, L-alanine, L-valine, L-leucine, L-isoleucine, L-phenylalanine, L-tyrosine, L-glutamine, L-glutamic acid, L-asparagine, L-aspartic acid, L-serine, L-threonine, L-cysteine, L-methionine, L-proline, L-lysine, L-arginine, L-tryptophan, L-histidine, L-pyrolysine, L-pyroglutamine, L-4-trans-hydroxyproline, L-3-cis-hydroxyproline, L-homoserine, L-homocysteine, L-cystine, L-ornithine and L-citrulline, and are preferably chosen from the group consisting of L-glutamine, L-glutamic acid, L-asparagine, L-aspartic acid, L-valine, L-arginine, and L-lysine, and salts thereof.

4. The composition according to claim 1, comprising:
   (a) 10 to 40 wt % of the at least three different inorganic salts;
   (b) 30 to 80 wt % of the one or more mono- or polyvalent salts of polybasic food acids;
   (c) 2 to 25 wt % of at least three different proteinogenic L-amino acids or amino acids formed by primary or secondary metabolic pathways, or salts thereof, which are suitable for nutrition; and
   (d) 0 to 15 wt % of sodium chloride, in each case based on the dry mass of the mixture.

5. The composition according to claim 1, wherein
component (b) comprises potassium succinate, dipotassium succinate, potassium malate and/or dipotassium malate, and
component (c) comprises at least three different amino acids selected from the group consisting of L-glutamine, L-glutamic acid, L-asparagine, L-aspartic acid, L-valine, L-arginine, and L-lysine, and salts thereof.

6. The composition according to claim 1, wherein the content of components (a), (b) and (c) is in the range of from 50 to 100 wt %, based on the dry mass of the mixture.

7. The composition according to claim 1, the mixture further comprising 0 to 3 wt % of a sweet-tasting mono- or disaccharide.

8. A powder which can be prepared by dissolving the composition according to claim 1 in water and drying the solution.

9. A composition which is suitable for consumption, comprising the composition according to claim 1 and one or more further constituents which are suitable for consumption.

10. A composition according to claim 9, wherein one or more further constituents are selected from the group consisting of:
    solid carrier substances,
    solid carrier substances and aroma compositions,
    water,
    an oily phase,
    one or more W/O emulsifiers,
    one or more antioxidants, and
    one or more substances for intensifying an antioxidative action.

11. A composition according to claim 9, further comprising a sweet-tasting mono- or disaccharide, a substance for masking or reducing an unpleasant taste impression and/or a substance for enhancing a pleasant taste impression.

12. A (i) ready-to-use or -eat formulation or (ii) semi-finished product which serves for nutrition or consumption for pleasure, comprising the composition according to claim 1.

13. A process for the preparation of a powder according to claim 8, comprising: dissolving of a composition comprising a mixture according to claim 1 in water and drying of the solution.

14. A process for generating or enhancing the common salt taste in a (i) ready-to-eat formulation or (ii) semi-finished product which serves for nutrition or consumption for pleasure, comprising:
    (a) mixing an amount which is active in terms of taste of a composition comprising a mixture according to claim 1 with further constituents of the (i) ready-to-eat formulation or the (ii) semi-finished product;
    (b) applying an amount which is active in terms of taste of a composition comprising a mixture according to claim 1 to one or more further constituents of the (i) ready-to-eat formulation or the (ii) semi-finished product: or
    (c) embedding an amount which is active in terms of taste of a composition comprising a mixture according to claim 1 in a covering or matrix material.

* * * * *